US007211639B2

(12) United States Patent
Yeager et al.

(10) Patent No.: US 7,211,639 B2
(45) Date of Patent: May 1, 2007

(54) COMPOSITION COMPRISING FUNCTIONALIZED POLY(ARYLENE ETHER) AND ETHYLENE-ALKYL (METH)ACRYLATE COPOLYMER, METHOD FOR THE PREPARATION THEREOF, AND ARTICLES PREPARED THEREFROM

(75) Inventors: Gary William Yeager, Rexford, NY (US); Bryan Duffey, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/678,249

(22) Filed: Oct. 3, 2003

(65) Prior Publication Data

US 2005/0075472 A1  Apr. 7, 2005

(51) Int. Cl.
 C08G 63/00 (2006.01)
 C08L 71/12 (2006.01)
(52) U.S. Cl. .................. 528/126; 528/179; 528/205; 525/132; 525/139; 525/393; 525/391; 525/534
(58) Field of Classification Search ................ 528/176, 528/179, 205; 525/132, 255, 391, 139, 393, 525/534
See application file for complete search history.

(56) References Cited

U.S. PATENT DOCUMENTS

| 2,933,480 | A | 4/1960 | Gresham et al. |
|---|---|---|---|
| 3,093,621 | A | 6/1963 | Gladding et al. |
| 3,211,709 | A | 10/1965 | Adamek et al. |
| 3,306,875 | A | 2/1967 | Hay |
| 3,375,228 | A | 3/1968 | Holoch et al. |
| 3,646,168 | A | 2/1972 | Barrett et al. |
| 3,665,058 | A | 5/1972 | Snodgrass et al. |
| 3,790,519 | A | 2/1974 | Wahlborg et al. |
| 3,884,993 | A | 5/1975 | Gros et al. |
| 3,894,999 | A | 7/1975 | Boozer et al. |
| 4,059,654 | A | 11/1977 | Von Bodungen et al. |
| 4,081,587 | A | 3/1978 | Clampitt et al. |
| 4,097,550 | A | 6/1978 | Haaf et al. |
| 4,148,843 | A | 4/1979 | Goossens |
| 4,166,055 | A | 8/1979 | Lee, Jr. et al. |
| 4,442,251 | A | 4/1984 | Haaf et al. |
| 4,562,243 | A | 12/1985 | Percec |
| 4,584,334 | A | 4/1986 | Lee, Jr. et al. |
| 4,634,742 | A | 1/1987 | Percec |
| 4,663,402 | A | 5/1987 | Percec et al. |
| 4,665,137 | A | 5/1987 | Percec |
| 4,677,185 | A | 6/1987 | Heltz et al. |
| 4,701,514 | A | 10/1987 | Percec |
| 4,760,118 | A | 7/1988 | White et al. |
| H521 | H | 9/1988 | Fan |
| 4,782,108 | A | 11/1988 | Yano et al. |
| 4,806,601 | A | 2/1989 | Percec |
| 4,814,393 | A | 3/1989 | Ishihara et al. |
| 4,892,904 | A | 1/1990 | Ting |
| 4,923,932 | A | 5/1990 | Katayose et al. |
| 5,008,333 | A | 4/1991 | Yates et al. |
| 5,061,753 | A | 10/1991 | Maruyama et al. |
| 5,071,922 | A | 12/1991 | Nelissen et al. |
| 5,079,268 | A | 1/1992 | Nelissen et al. |
| 5,091,480 | A | 2/1992 | Percec |
| 5,162,435 | A | 11/1992 | Shibuya et al. |
| 5,171,761 | A | 12/1992 | Penco et al. |
| 5,219,951 | A | 6/1993 | Nelissen et al. |
| 5,258,455 | A | 11/1993 | Laughner et al. |
| 5,304,600 | A | 4/1994 | Nelissen et al. |
| 5,310,820 | A | 5/1994 | Nelissen et al. |
| 5,338,796 | A | 8/1994 | Vianello |
| 5,352,745 | A | 10/1994 | Katayose et al. |
| 5,376,724 | A | 12/1994 | Bailly et al. |
| 5,461,096 | A | 10/1995 | Bopp et al. |
| 5,543,233 | A | 8/1996 | Latiolais et al. |
| 5,571,878 | A | 11/1996 | Latiolais et al. |
| 5,576,396 | A | 11/1996 | Wang et al. |
| 5,834,565 | A | 11/1998 | Tracy et al. |
| 5,965,663 | A | 10/1999 | Hayase |
| 5,986,027 | A | 11/1999 | Lippert et al. |
| 6,051,662 | A | 4/2000 | Tracy et al. |
| 6,057,013 | A | 5/2000 | Ching et al. |
| 6,251,308 | B1 | 6/2001 | Butler |
| 6,255,371 | B1 | 7/2001 | Schlosser et al. |
| 6,352,782 | B2 * | 3/2002 | Yeager et al. ............... 428/461 |
| 6,355,832 | B1 | 3/2002 | Weferling et al. |
| 6,384,176 | B1 | 5/2002 | Braat et al. |
| 6,388,046 | B1 | 5/2002 | Campbell et al. |

(Continued)

FOREIGN PATENT DOCUMENTS

DE  31 17 514 A1  5/1981

(Continued)

OTHER PUBLICATIONS

International Search Report; International Application No. PCT/US2004/028275; International Filing Date Aug. 31, 2004; Date of Mailing Jun. 12, 2004; 6 pages.

(Continued)

*Primary Examiner*—Duc Truong

(57) ABSTRACT

A thermoplastic composition includes a functionalized poly(arylene ether) and a copolymer of (a) ethylene or an α-olefin, and (b) an alkyl(meth)acrylate. Optional components in the composition include an impact modifier and a flame retardant. The composition is useful for fabricating wire and cable insulation.

28 Claims, No Drawings

U.S. PATENT DOCUMENTS

| | | |
|---|---|---|
| 6,414,084 B1 | 7/2002 | Adedeji |
| 6,420,459 B1 | 7/2002 | Horold |
| 6,469,124 B2 | 10/2002 | Braat et al. |
| 6,521,703 B2 | 2/2003 | Zarnoch et al. |
| 6,534,673 B1 | 3/2003 | Weferling et al. |
| 6,541,585 B2 | 4/2003 | Johnson et al. |
| 6,547,992 B1 | 4/2003 | Schlosser et al. |
| 6,569,982 B2 | 5/2003 | Hwang et al. |
| 6,617,398 B2 | 9/2003 | Yeager et al. |
| 6,627,704 B2 | 9/2003 | Yeager et al. |
| 6,627,708 B2 | 9/2003 | Braat et al. |
| 6,794,481 B2 | 9/2004 | Amagai et al. |
| 2002/0120160 A1 | 8/2002 | Watanabe et al. |
| 2002/0169256 A1 | 11/2002 | Merfeld et al. |
| 2002/0173597 A1 | 11/2002 | Zarnoch et al. |
| 2002/0177027 A1 | 11/2002 | Yeager et al. |
| 2003/0096123 A1 | 5/2003 | Yeager |
| 2003/0215588 A1 | 11/2003 | Yeager et al. |
| 2004/0146692 A1 | 7/2004 | Inoue et al. |

FOREIGN PATENT DOCUMENTS

| | | |
|---|---|---|
| DE | 41 03 140 A1 | 2/1991 |
| EP | 0 413 972 A2 | 7/1990 |
| EP | 0 261 574 B1 | 11/1991 |

OTHER PUBLICATIONS

C. Pugh and V. Percec, Polym. Prepr. (Am. Chem. Soc., Div. Polym. Chem.) (1985), 26 (2), 303-5.

JP 10025412; A2; 19980127 (Abstract Only).

https://search.ip.com/viewPub.isp?pubID=IPCOM000007658D Hua Guo, "PPE-grafted-EVA for Use in the Cable and Wire Industry" Printed Apr. 30, 2002; 2 pages.

JP 03185059; A2; 19910813 (Abstract Only).

DE 19602139; A1; 19960725 (Abstract Only).

* cited by examiner

COMPOSITION COMPRISING FUNCTIONALIZED POLY(ARYLENE ETHER) AND ETHYLENE-ALKYL (METH)ACRYLATE COPOLYMER, METHOD FOR THE PREPARATION THEREOF, AND ARTICLES PREPARED THEREFROM

BACKGROUND

Thermoplastic compositions comprising poly(arylene ether) resins and ethylene-alkyl acrylate copolymers are known in the art. For example, U.S. Pat. No. 4,442,251 to Haaf et al. generally describes compositions of polyphenylene ether resin, optionally containing an impact modifier, and small amounts of a copolymer of ethylene and methyl acrylate. U.S. Pat. No. 5,008,333 to Yates et al. generally describes thermoplastic blends prepared from a polyphenylene ether, a linear polyester such as poly(alkylene dicarboxylate), a polymer containing a substantial proportion or aromatic polycarbonate units, and property improving amounts of an alkylene acrylate copolymer. U.S. Pat. No. 5,162,435 to Shibuya et al. generally describes a resin composition comprising 20–77 weight percent of a polyolefin, 20–77 weight percent of a polyphenylene ether resin, 2–50 weight percent of a polymer including an alkenyl aromatic polymerization chain and an aliphatic hydrocarbon chain, and 1–25 weight of an ester-group-containing ethylene copolymer. There remains a need for compositions comprising poly(arylene ether) resins and ethylene-alkyl acrylate copolymers, where the compositions exhibit improved resin compatibility and improved tensile properties.

BRIEF SUMMARY

One embodiment of the invention is a composition, comprising: a functionalized poly(arylene ether); and an olefin-alkyl acrylate copolymer. Other embodiments, including a method of preparing the composition and articles comprising the composition, are described below.

DETAILED DESCRIPTION OF THE PREFERRED EMBODIMENTS

The present inventors have found that desirable and previously unattainable combinations of properties—particularly high tensile strength, tensile modulus, and tensile elongation—are provided by a composition, comprising: a functionalized poly(arylene ether); and an olefin-alkyl acrylate copolymer. The functionalized poly(arylene ether) may be a capped poly(arylene ether), a ring-functionalized poly(arylene ether), or a maleic anhydride-functionalized poly(arylene ether).

The functionalized poly(arylene ether) may be a capped poly(arylene ether). A capped poly(arylene ether) is defined herein as a poly(arylene ether) in which at least 50%, preferably at least 75%, more preferably at least 90%, yet more preferably at least 95%, even more preferably at least 99%, of the free hydroxyl groups present in the corresponding uncapped poly(arylene ether) have been functionalized by reaction with a capping agent.

The capped poly(arylene ether) may be represented by the structure

Q(J-K)

wherein Q is the residuum of a monohydric, dihydric, or polyhydric phenol, preferably the residuum of a monohydric or dihydric phenol, more preferably the residuum of a monohydric phenol; y is 1 to 100; J comprises repeating structural units having the formula

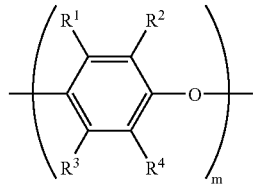

wherein m is 1 to about 200, preferably 2 to about 200, $R^1$ and $R^3$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbonoxy, $C_2$–$C_{12}$ halohydrocarbonoxy wherein at least two carbon atoms separate the halogen and oxygen atoms, or the like; $R^2$ and $R^4$ are each independently halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbonoxy, $C_2$–$C_{12}$ halohydrocarbonoxy wherein at least two carbon atoms separate the halogen and oxygen atoms, or the like; and K is a capping group produced by reaction of a phenolic hydroxyl group on the poly(arylene ether) with a capping reagent. The resulting capping group may be

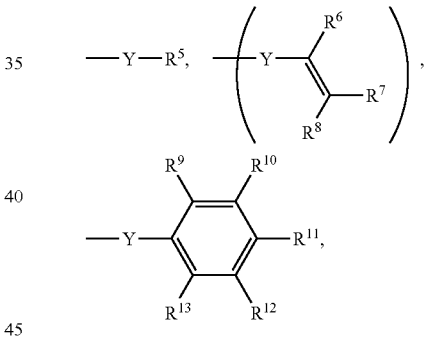

or the like, wherein $R^5$ is $C_1$–$C_{12}$ alkyl, or the like; $R^6$–$R^8$ are each independently hydrogen, $C_1$–$C_{18}$ hydrocarbyl, alkyl, $C_2$–$C_{18}$ hydrocarbyloxycarbonyl, nitrile, formyl, carboxylate, imidate, thiocarboxylate, or the like; $R^9$–$R^{13}$ are each independently hydrogen, halogen, $C_1$–$C_{12}$ alkyl, hydroxy, amino, or the like; and wherein Y is a divalent group such as

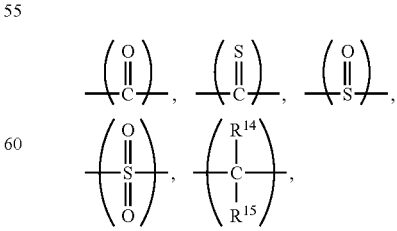

or the like, wherein $R^{14}$ and $R^{15}$ are each independently hydrogen, $C_1$–$C_{12}$ alkyl, or the like. As used herein, "hydrocarbyl" refers to a residue that contains only carbon and hydrogen. The residue may be aliphatic or aromatic, straight-chain, cyclic, branched, saturated or unsaturated. The hydrocarbyl residue, when so stated however, may contain heteroatoms over and above the carbon and hydrogen members of the substituent residue. Thus, when specifically noted as containing such heteroatoms, the hydrocarbyl residue may also contain carbonyl groups, amino groups, hydroxyl groups, or the like, or it may contain heteroatoms within the backbone of the hydrocarbyl residue. As used herein, the term "haloalkyl" includes alkyl groups substituted with one or more halogen atoms, including partially and fully halogenated alkyl groups.

In one embodiment, Q is the residuum of a phenol, including polyfunctional phenols, and includes radicals of the structure

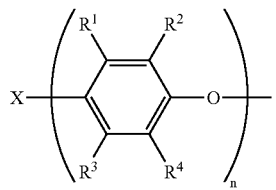

wherein $R^1$ and $R^3$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl phenyl, $C_1$–$C_{12}$ haloalkyl, $C_1$–$C_{12}$ hydrocarbonoxy, $C_2$–$C_{12}$ halohydrocarbonoxy wherein at least two carbon atoms separate the halogen and oxygen atoms, or the like; $R^2$ and $R^4$ are each independently halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbonoxy, $C_2$–$C_{12}$ halohydrocarbonoxy wherein at least two carbon atoms separate the halogen and oxygen atoms, or the like; X may be hydrogen, $C_1$–$C_{12}$ alkyl, $C_6$–$C_{18}$ aryl, $C_7$–$C_{18}$ alkyl-substituted aryl, $C_7$–$C_{18}$ aryl-substituted alkyl or any of the foregoing hydrocarbon groups containing at least one substituent such as carboxylic acid, aldehyde, alcohol, amino radicals, or the like; X also may be sulfur, sulfonyl, sulfuryl, oxygen, or other such bridging group having a valence of 2 or greater to result in various bis- or higher polyphenols; y and n are each independently 1 to about 100, preferably 1 to 3, and more preferably about 1 to 2; in a preferred embodiment, y=n. Q may also be the residuum of a diphenol, such as 2,2',6,6'-tetramethyl-4,4'-diphenol.

In one embodiment, the capped poly(arylene ether) is produced by capping a poly(arylene ether) consisting essentially of the polymerization product of at least one monohydric phenol having the structure

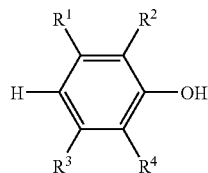

wherein $R^1$ and $R^3$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbonoxy, $C_2$–$C_{12}$ halohydrocarbonoxy wherein at least two carbon atoms separate the halogen and oxygen atoms, or the like; $R^2$ and $R^4$ are each independently halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbonoxy, $C_2$–$C_{12}$ halohydrocarbonoxy wherein at least two carbon atoms separate the halogen and oxygen atoms, or the like. Suitable monohydric phenols include those described in U.S. Pat. No. 3,306,875 to Hay, and highly preferred monohydric phenols include 2,6-dimethylphenol and 2,3,6-trimethylphenol. The poly(arylene ether) may be a copolymer of at least two monohydric phenols, such as 2,6-dimethylphenol and 2,3,6-trimethylphenol.

In one embodiment, the capped poly(arylene ether) comprises at least one capping group having the structure

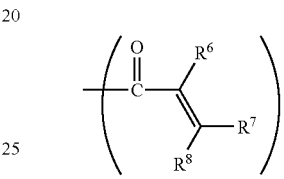

wherein $R^6$–$R^8$ are each independently hydrogen, $C_1$–$C_{18}$ hydrocarbyl, alkyl, $C_2$–$C_{18}$ hydrocarbyloxycarbonyl, nitrile, formyl, carboxylate, imidate, thiocarboxylate, or the like. Highly preferred capping groups include acrylate ($R^6$=$R^7$=$R^8$=hydrogen) and methacrylate ($R^6$=methyl, $R^7$=$R^8$=hydrogen).

In another embodiment, the capped poly(arylene ether) comprises at least one capping group having the structure

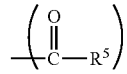

wherein $R^5$ is $C_1$–$C_{12}$ alkyl, preferably $C_1$–$C_6$ alkyl, more preferably methyl, ethyl, or isopropyl. The present inventors have surprisingly found that the advantageous properties of their invention can be achieved even when the capped poly(arylene ether) lacks a polymerizable function such as a carbon-carbon double bond.

In yet another embodiment, the capped poly(arylene ether) comprises at least one capping group having the structure

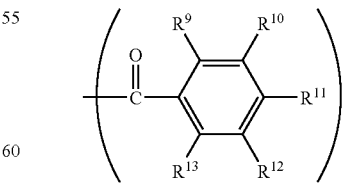

wherein $R^9$–$R^{13}$ are each independently hydrogen, halogen, $C_1$–$C_{12}$ alkyl, hydroxy, amino, or the like. Preferred capping groups of this type include salicylate ($R^9$=hydroxy, $R^{10}$–$R^{13}$=hydrogen).

In still another embodiment, the capped poly(arylene ether) comprises at least one capping group having the structure

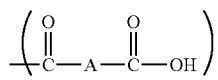

wherein A is a saturated or unsaturated $C_2$–$C_{12}$ divalent hydrocarbon group such as, for example, ethylene, 1,2-propylene, 1,3-propylene, 2-methyl-1,3-propylene, 2,2-dimethyl-1,3-propylene, 1,2-butylene, 1,3-butylene, 1,4-butylene, 2-methyl-1,4-butylene, 2,2-dimethyl-1,4-butylene, 2,3-dimethyl-1,4-butylene, vinylene (—CH═CH—), 1,2-phenylene, and the like. These capped poly(arylene ether) resins may conveniently be prepared, for example, by reaction of an uncapped poly(arylene ether) with a cyclic anhydride capping agent. Such cyclic anhydride capping agents include, for example, maleic anhydride, succinic anhydride, glutaric anhydride, adipic anhydride, phthalic anhydride, and the like.

There is no particular limitation on the method by which the capped poly(arylene ether) is prepared. The capped poly(arylene ether) may be formed by the reaction of an uncapped poly(arylene ether) with a capping agent. Capping agents include compounds known in the literature to react with phenolic groups. Such compounds include both monomers and polymers containing, for example, anhydride, acid chloride, epoxy, carbonate, ester, isocyanate, cyanate ester, or alkyl halide radicals. Capping agents are not limited to organic compounds as, for example, phosphorus and sulfur based capping agents also are included. Examples of capping agents include, for example, acetic anhydride, succinic anhydride, maleic anhydride, salicylic anhydride, polyesters comprising salicylate units, homopolyesters of salicylic acid, acrylic anhydride, methacrylic anhydride, glycidyl acrylate, glycidyl methacrylate, acetyl chloride, benzoyl chloride, diphenyl carbonates such as di(4-nitrophenyl)carbonate, acryloyl esters, methacryloyl esters, acetyl esters, phenylisocyanate, 3-isopropenyl-alpha,alpha-dimethylphenylisocyanate, cyanatobenzene, 2,2-bis(4-cyanatophenyl) propane), 3-(alpha-chloromethyl)styrene, 4-(alpha-chloromethyl)styrene, allyl bromide, and the like, carbonate and substituted derivatives thereof, and mixtures thereof. These and other methods of forming capped poly(arylene ether)s are described, for example, in U.S. Pat. No. 3,375,228 to Holoch et al.; U.S. Pat. No. 4,148,843 to Goossens; U.S. Pat. Nos. 4,562,243, 4,663,402, 4,665,137, and 5,091,480 to Percec et al.; U.S. Pat. Nos. 5,071,922, 5,079,268, 5,304,600, and 5,310,820 to Nelissen et al.; U.S. Pat. No. 5,338,796 to Vianello et al.; and European Patent No. 261,574 B1 to Peters et al.

In a preferred embodiment, the capped poly(arylene ether) may be prepared by reaction of an uncapped poly (arylene ether) with an anhydride in an alkenyl aromatic monomer as solvent. This approach has the advantage of generating the capped poly(arylene ether) in a form that can be immediately blended with other components to form a curable composition; using this method, no isolation of the capped poly(arylene ether) or removal of unwanted solvents or reagents is required.

A capping catalyst may be employed in the reaction of an uncapped poly(arylene ether) with an anhydride. Examples of such compounds include those known to the art that are capable of catalyzing condensation of phenols with the capping agents described above. Useful materials are basic compounds including, for example, basic compound hydroxide salts such as sodium hydroxide, potassium hydroxide, tetraalkylammonium hydroxides, and the like; tertiary alkylamines such as tributyl amine, triethylamine, dimethylbenzylamine, dimethylbutylamine and the like; tertiary mixed alkyl-arylamines and substituted derivatives thereof such as N,N-dimethylaniline; heterocyclic amines such as imidazoles, pyridines, and substituted derivatives thereof such as 2-methylimidazole, 2-vinylimidazole, 4-(dimethylamino)pyridine, 4-(1-pyrrolino)pyridine, 4-(1-piperidino)pyridine, 2-vinylpyridine, 3-vinylpyridine, 4-vinylpyridine, and the like. Also useful are organometallic salts such as, for example, tin and zinc salts known to catalyze the condensation of, for example, isocyanates or cyanate esters with phenols. The organometallic salts useful in this regard are known to the art in numerous publications and patents well known to those skilled in this art.

The functionalized poly(arylene ether) may be a ring-functionalized poly(arylene ether). In one embodiment, the ring-functionalized poly(arylene ether) is a poly(arylene ether) comprising repeating structural units of the formula

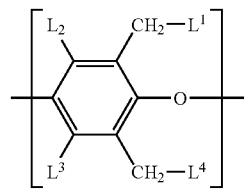

wherein each $L^1$–$L^4$ is independently hydrogen, an alkenyl group, or an alkynyl group;

wherein the alkenyl group is represented by

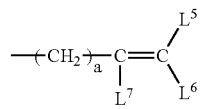

wherein $L^5$–$L^7$ are independently hydrogen or methyl, and a is an integer from 0 to 4;

wherein the alkynyl group is represented by

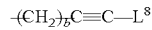

wherein $L^8$ is hydrogen, methyl, or ethyl, and b is an integer from 0 to 4; and wherein about 0.02 mole percent to about 25 mole percent of the total $L^1$–$L^4$ substituents in the ring-functionalized poly(arylene ether) are alkenyl and/or alkynyl groups. Within this range, it may be preferred to have at least about 0.1 mole percent, more preferably at least about 0.5 mole percent, alkenyl and/or alkynyl groups. Also within this range, it may be preferred to have up to about 15 mole percent, more preferably up to about 10 mole percent, alkenyl and/or alkynyl groups.

The ring-functionalized poly(arylene ether) may be prepared according to known methods. For example, an unfunctionalized poly(arylene ether) such as poly(2,6-dimethyl-1, 4-phenylene ether) may be metalized with a reagent such as n-butyl lithium and subsequently reacted with an alkenyl halide such as allyl bromide and/or an alkynyl halide such as propargyl bromide. This and other methods for preparation of ring-functionalized poly(arylene ether) resins are described, for example, in U.S. Pat. No. 4,923,932 to Katayose et al.

In another embodiment, the ring-functionalized poly (arylene ether) is the product of the melt reaction of a poly(arylene ether) and an α,β-unsaturated carbonyl compound or a β-hydroxy carbonyl compound. Examples of α,β-unsaturated carbonyl compounds include, for example, maleic anhydride, citriconic anhydride, and the like. Examples of β-hydroxy carbonyl compounds include, for example, citric acid, and the like. Such functionalization is typically carried out by melt mixing the poly(arylene ether) with the desired carbonyl compound at a temperature of about 190 to about 290° C.

It will be understood that the poly(arylene ether)s described herein as "uncapped" or "unfunctionalized" comprise repeating structural units having the formula

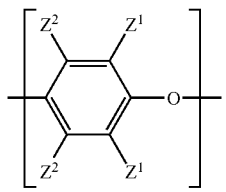

wherein for each structural unit, each $Z^1$ is independently hydrogen, halogen, primary or secondary $C_1$–$C_{12}$ alkyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbonoxy, $C_1$–$C_{12}$ halohydrocarbonoxy wherein at least two carbon atoms separate the halogen and oxygen atoms, or the like; and each $Z^2$ is independently halogen, primary or secondary $C_1$–$C_{12}$ alkyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbonoxy, $C_1$–$C_{12}$ halohydrocarbonoxy wherein at least two carbon atoms separate the halogen and oxygen atoms, or the like. Preferably, each $Z^1$ is $C_{1-4}$ alkyl, and each $Z^2$ is hydrogen or methyl.

There is no particular limitation on the molecular weight or intrinsic viscosity of the functionalized poly(arylene ether). In one embodiment, the composition may comprise a functionalized poly(arylene ether) having a number average molecular weight of about 3,000 to about 25,000 atomic mass units (AMU). Within this range, it may be preferable to use a functionalized poly(arylene ether) having a number average molecular weight of at least about 10,000 AMU, more preferably at least about 15,000 AMU.

In another embodiment, the composition may comprise a functionalized poly(arylene ether) having an intrinsic viscosity of about 0.1 to about 0.6 deciliters per gram (dL/g) as measured in chloroform at 25° C. Within this range, the functionalized poly(arylene ether) intrinsic viscosity may preferably be at least about 0.2 dL/g, more preferably at least 0.25 dL/g. Also within this range, the functionalized poly (arylene ether) intrinsic viscosity may preferably be up to about 0.5 dL/g, still more preferably up to about 0.4 dL/g. Generally, the intrinsic viscosity of a functionalized poly (arylene ether) will vary insignificantly from the intrinsic viscosity of the corresponding unfunctionalized poly (arylene ether). Specifically, the intrinsic viscosity of a functionalized poly(arylene ether) will generally be within 10% of that of the unfunctionalized poly(arylene ether). It is expressly contemplated to employ blends of at least two functionalized poly(arylene ether)s having different molecular weights and intrinsic viscosities.

The composition may comprise a blend of at least two functionalized poly(arylene ethers). Such blends may be prepared from individually prepared and isolated functionalized poly(arylene ethers). Alternatively, such blends may be prepared by reacting a single poly(arylene ether) with at least two functionalizing agents. For example, a poly (arylene ether) may be reacted with two capping agents, or a poly(arylene ether) may be metalized and reacted with two unsaturated alkylating agents. In another alternative, a mixture of at least two poly(arylene ether) resins having different monomer compositions and/or molecular weights may be reacted with a single functionalizing agent.

The composition may comprise the functionalized poly (arylene ether) in an amount of about 25 to about 95 parts by weight per 100 parts by weight total of the functionalized poly(arylene ether) and the olefin-alkyl(meth)acrylate copolymer. Within this range, it may be preferred to use a functionalized poly(arylene ether) amount of at least about 30 parts by weight, more preferably at least about 35 parts by weight. Also within this range, it may be preferred to use a functionalized poly(arylene ether) amount of up to about 75 parts by weight, more preferably up to about 65 parts by weight, yet more preferably up to about 55 parts by weight.

The composition comprises an olefin-alkyl(meth)acrylate copolymer. The olefin-alkyl(meth)acrylate copolymer is preferably the polymerization product of (a) ethylene or a $C_3$–$C_8$ α-olefin, and (b) an alkyl(meth)acrylate, wherein the alkyl is $C_1$–$C_8$ alkyl and (meth)acrylate signifies either acrylate or methacrylate. The copolymer is preferably formed by polymerizing the two monomer types in a ratio of about 60 to about 95 weight percent of the olefin and about 5 to about 40 weight percent of the alkyl(meth)acrylate per 100 parts by weight total monomer. Within this monomer ratio range, it may be preferably to use at least about 15 weight percent alkyl (meth)acrylate, more preferably at least about 20 weight percent alkyl (meth)acrylate, still more preferably at least about 25 weight percent alkyl (meth) acrylate.

The olefin used to prepare the olefin-alkyl(meth)acrylate copolymer is preferably ethylene, propylene, 1-butene, 1-pentene, 1-hexene, 1-heptene, 1-octene, 4-methyl-1-pentene, or the like. For the alkyl (meth)acrylate monomer used to prepare the olefin-alkyl(meth)acrylate copolymer, the alkyl group is preferably methyl, ethyl, propyl, n-butyl, n-pentyl, n-hexyl, n-heptyl, n-octyl, or the like. Highly preferred alkyl groups include methyl. The olefin-alkyl (meth)acrylate copolymer is preferably ethylene-methyl acrylate copolymer, ethylene-ethyl acrylate copolymer, ethylene-methyl methacrylate copolymer, ethylene-ethyl methacrylate copolymer, or the like. Highly preferred olefin-alkyl (meth)acrylate copolymers include ethylene-methyl acrylate copolymer.

In one embodiment, the olefin-alkyl(meth)acrylate copolymer is the polymerization product of monomers consisting of the olefin and alkyl(meth)acrylate described above. In another embodiment, the monomers may further comprise a polar comonomer such as maleic anhydride, maleic acid, acrylic acid, methacrylic acid, carbon monoxide, phenyl vinyl ketone, maleimide, glycidyl(meth)acrylate, hydroxyethyl(meth)acrylate, or the like. In this embodiment, the product copolymer is a terpolymer. Suitable terpolymers include ethylene-methyl acrylate-glycidyl methacrylate terpolymer, ethylene methyl acrylate maleic anhydride terpolymer, ethylene-methyl acrylate-carbon monoxide terpolymer, ethylene-methyl acrylate-methacrylic acid terpolymer, ethylene-methyl acrylate-triethoxysilylethylene terpolymer, and the like. Use of one or more of these polar comonomers may modify the miscibility of the olefin-alkyl(meth)acrylate copolymer and the functionalized poly(arylene ether). It may also produce reactive sites on the ethylene elastomer for reaction with inorganic salts, aziridines, epoxides, alcohols and the like. Such chemistry can could be used to crosslink the system and improve properties such as strength and solvent resistance. When present, the polar monomer may comprise about 1 to about 25 weight percent of the total monomer used to prepare the olefin-alkyl(meth)acrylate copolymer.

In another embodiment, the olefin-alkyl(meth)acrylate copolymer is the polymerization product of the olefin and alkyl(meth)acrylate described above and further comprises grafted $\alpha,\beta$-unsaturated carbonyl compounds or $\beta$-hydroxycarbonyl compounds. Representative examples of $\alpha,\beta$-unsaturated carbonyl compounds include maleic anhydride, malonic acid, and the like. Representative examples of $\beta$-hydroxycarbonyl compounds include citric acid, isocitric acid, malic acid, and the like. The graft copolymers of this embodiment include, for example, polyethylene-methylacrylate-graft-maleic anhydride.

The olefin-alkyl(meth)acrylate copolymer preferably has a solubility parameter greater than 17.5 $J^{1/2}/cm^{3/2}$, preferably greater than 18 $J^{1/2}/cm^{3/2}$, still more preferably greater than 18.2 $J^{1/2}/cm^{3/2}$. Solubility parameter values may be calculated according to the group contribution methods described in D. W. Van Krevelen, "Properties of Polymers," Elsevier Scientific Publishing, New York, 1976, pages 129–143.

Methods of preparing olefin-alkyl(meth)acrylate copolymers are known in the art. Suitable methods are described, for example, in U.S. Pat. No. 4,081,587 to Clampitt et al., U.S. Pat. Nos. 5,543,233 and 5,571,878 to Latiolais et al., U.S. Pat. No. 5,576,396 to Wang et al., U.S. Pat. No. 5,986,027 to Lippert et al., U.S. Pat. No. 6,057,013 to Ching et al., U.S. Pat. No. 6,541,585 to Johnson et al.; and U.S. Patent Application Publication Nos. 2002-120160 A1 to Watanabe et al. Commercially available examples of useful olefin-alkyl (meth)acrylate copolymers include ethylene-methyl acrylate copolymer available from Chevron Chemical Company as PE 2205 (methyl acrylate content of 20% by weight and a melt index of 2.4 grams/minute (g/min); and from Atofina as LOTRYL® 7BA01 having an acrylic ester content of 6 to 8% by weight and a melt flow rate of from 1 to 1.5 g/min, as well as LOTRYL® 15MA05, 18MA05, 24MA005, 24MA07, 28MA07, 29MA03, 35MA05. Other materials include ethylene-n-butyl acrylates available from Atochem under the designation LOTRYL® such as LOTRYL® 17BA04 (containing 16 to 19% by weight of acrylic ester and having a melt flow rate of 3.5 to 4.5 g/min at 190° C. and 9.8 g/min at 230° C.); and LOTRYL® 17BA07 having an acrylic ester content of 16 to 19% by weight and a melt flow rate of 6.5 to about 8 g/min.

The composition may comprise about 5 to about 75 parts by weight of the olefin-alkyl(meth)acrylate copolymer per 100 parts by weight total of the functionalized poly(arylene ether) and the olefin-alkyl(meth)acrylate copolymer. Within this range, the olefin-alkyl(meth)acrylate copolymer amount may preferably be at least about 15 parts by weight, more preferably at least about 30 parts by weight, still more preferably at least about 45 parts by weight. Also within this range, the olefin-alkyl(meth)acrylate copolymer amount may preferably be up to about 65 parts by weight, more preferably up to about 55 parts by weight.

The composition may, optionally, comprise an impact modifier. Suitable impact modifiers include natural and synthetic elastomeric polymers such as natural rubbers, synthetic rubbers and thermoplastic elastomers. They are typically derived from monomers such as olefins (e.g., ethylene, propylene, 1-butene, 4-methyl-1-pentene), alkenyl aromatic monomers (e.g., styrene and $\alpha$-methyl styrene), conjugated dienes (e.g., butadiene, isoprene, and chloroprene), and vinylcarboxylic acids and their derivatives (e.g., vinyl acetate, acrylic acid, and acrylonitrile). They may be homopolymers as well as copolymers including random, block, graft and core shell copolymers derived from these various suitable monomers discussed more particularly below. Polyolefins suitable for use as impact modifiers include polyethylene, polypropylene and polyisobutylene with preferred homopolymers being polyethylene, LLDPE (linear low density polyethylene), HDPE (high density polyethylene) and MDPE (medium density polyethylene) and isotactic polypropylene. Polyolefin resins of this general structure and methods for their preparation are well known in the art and are described for example in U.S. Pat. No. 2,933,480 to Gresham et al., U.S. Pat. No. 3,093,621 to Gladding et al., U.S. Pat. No. 3,211,709 to Adamek et al., U.S. Pat. No. 3,646,168 to Barrett et al., U.S. Pat. No. 3,790,519 to Wahlborg et al., U.S. Pat. No. 3,884,993 to Gros et al., U.S. Pat. No. 3,894,999 to Boozer et al., U.S. Pat. No. 4,059,654 to Van Bodungen et al., U.S. Pat. No. 4,166,055 to Lee, Jr., and U.S. Pat. No. 4,584,334 to Lee, Jr. et al.

Copolymers of polyolefins may also be used such as copolymers of ethylene and alpha olefins like propylene and 4-methylpentene-1. Copolymers of ethylene and $C_3$–$C_{10}$ monoolefins and non-conjugated dienes, herein referred to as EPDM copolymers, are also suitable. Examples of suitable $C_3$–$C_{10}$ monoolefins for EPDM copolymers include propylene, propene, 1-butene, 2-butene, 1-pentene, 2-pentene, 1-hexene, 2-hexene and 3-hexene. Suitable dienes include 1,4-hexadiene and monocylic and polycyclic dienes. Ratios of ethylene to other $C_3$–$C_{10}$ monoolefin monomers can range from 95:5 to 5:95 with diene units being present in the amount of from 0.1 to 10 mole percent. EPDM copolymers may be functionalized with an acyl group or electrophilic group for grafting onto the polyphenylene ether as disclosed in U.S. Pat. No. 5,258,455 to Laughner et al.

Other suitable impact modifiers include conjugated diene homopolymers and random copolymers. Examples include polybutadiene, butadiene-styrene copolymers, butadiene-acrylate copolymers, isoprene-isobutene copolymers, chlorobutadiene polymers, butadiene acrylonitrile polymers, and polyisoprene. In a preferred embodiment, the impact modifier is a block copolymer of an alkenyl aromatic compound and a conjugated diene. The block copolymer is a copolymer comprising (A) at least one block derived from an alkenyl aromatic compound and (B) at least one block derived from a conjugated diene, in which the aliphatic unsaturated group content in the block (B) is reduced by hydrogenation. The arrangement of blocks (A) and (B) includes a linear structure, a grafted structure, and a radial teleblock structure with or without a branched chain. Preferred among these structures are linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. More preferred are diblock, triblock, and tetrablock structures, with the A-B-A triblock structure being particularly preferred.

The alkenyl aromatic compound providing the block (A) is represented by formula

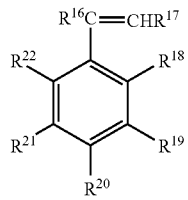

wherein $R^{16}$ and $R^{17}$ each independently represent a hydrogen atom, a $C_1$–$C_8$ alkyl group, a $C_2$–$C_8$ alkenyl group, or the like; $R^{18}$ and $R^{22}$ each independently represent a hydrogen atom, a $C_1$–$C_8$ alkyl group, a chlorine atom, a bromine atom, a carboxylic acid group (—$CO_2H$), a hydroxy group or the like; and $R^{19}$–$R^{21}$ each independently represent a hydrogen atom, a $C_1$–$C_8$ alkyl group, a $C_2$–$C_8$ alkenyl group, or the like, or $R^{18}$ and $R^{19}$ are taken together with the central aromatic ring to form a naphthyl group, or $R^{19}$ and $R^{20}$ are taken together with the central aromatic ring to form a naphthyl group.

Specific examples, of the alkenyl aromatic compounds include styrene, p-methylstyrene, alpha-methylstyrene, vinylxylenes, vinyltoluenes, vinylnaphthalenes, divinylbenzenes, bromostyrenes, chlorostyrenes, and the like, and combinations comprising at least one of the foregoing alkenyl aromatic compounds. Of these, styrene, alpha-methylstyrene, p-methylstyrene, vinyltoluenes, and vinylxylenes are preferred, with styrene being more preferred.

Specific examples of the conjugated diene include 1,3-butadiene, 2-methyl-1,3-butadiene, 2,3-dimethyl-1,3-butadiene, 1,3-pentadiene, and the like. Preferred among them are 1,3-butadiene and 2-methyl-1,3-butadiene, with 1,3-butadiene being more preferred. In addition to the conjugated diene, the hydrogenated block copolymer may contain a small proportion of a lower olefinic hydrocarbon such as, for example, ethylene, propylene, 1-butene, dicyclopentadiene, a non-conjugated diene, or the like.

The block copolymer may optionally be hydrogenated. When it is hydrogenated, it is preferably hydrogenated to such a degree that fewer than 50%, more preferably fewer than 20%, yet more preferably fewer than 10%, of the unsaturated bonds in the aliphatic chain moiety derived from the conjugated diene remain unreduced. The aromatic unsaturated bonds derived from the alkenyl aromatic compound may be hydrogenated to a degree of up to about 25%. The block copolymer may, optionally, comprise either grafted maleic anhydride functions or terminal hydroxyl groups.

Particularly preferred block copolymers are triblock copolymers and radial block copolymers. Examples of triblock copolymers are polystyrene-polybutadiene-polystyrene (SBS), hydrogenated polystyrene-polybutadiene-polystyrene (SEBS), polystyrene-polyisoprene-polystyrene (SIS), hydrogenated polystyrene-polyisoprene-polystyrene (SEPS), and poly(alpha methylstyrene)-polyisoprene-poly(alpha methylstyrene). Examples of commercially available triblock copolymers are the CARIFLEX®, KRATON® D, and KRATON® G polymers from Kraton Polymers; SEPTON® and HYBRAR® polymers from Kuraray; and TUFTEC® polymers from Asahi. Radial block copolymers generally comprise about 60 to 95 weight percent polymerized alkenyl aromatic monomer and about 40 to 5 weight percent polymerized conjugated diene monomer. The radial block copolymer has at least three polymer chains that form a radial configuration. Each chain terminates in a substantially nonelastic segment, to which the elastic polymer segment is joined. These block copolymers, sometimes referred to as "branched" polymers, are described in U.S. Pat. No. 4,097,550 to Haaf et al.

Also included among block copolymers are such materials further containing grafted functionality capable of crosslinking or forming covalent bonds with other components of the blend. Such groups include maleic anhydride, trialkoxysiloxane and the like.

The impact modifier, when present, may be used in an amount of about 0.1 to about 30 parts by weight per 100 parts by weight for the total of the functionalized poly (arylene ether) and the olefin-alkyl(meth)acrylate copolymer. With in this range, the impact modifier amount may preferably be at lease about 1 part by weight, more preferably at least about 2 parts by weight, still more preferably at least 5 parts by weight. Also within this range, the impact modifier amount may preferably be up to about 25 parts by weight, more preferably up to about 20 parts by weight, still more preferably up to about 15 parts by weight, even more preferably up to about 10 parts by weight.

The composition may optionally comprise a flame retardant. Suitable flame retardants include halosubstituted diaromatic compounds, such as 2,2-bis-(3,5-dichlorophenyl)propane, and phosphorous compounds as described in U.S. Pat. No. 5,461,096 to Bopp et al. Other examples of halosubstituted diaromatic flame retardant additives include brominated benzene, chlorinated biphenyl, brominated polystyrene, chlorine-containing aromatic polycarbonates or compounds comprising two phenyl radicals separated by a divalent alkylene group and having at least two chlorine or two bromine atoms per nucleus, and mixtures thereof.

The preferred flame retardant compounds employed in the compositions of the present invention are free of halogen. These preferred compounds include phosphorous compounds such as elemental phosphorous, organic phosphonic acids, phosphonates, phosphinates, phosphinites, phosphine oxides such as triphenylphosphine oxide, phosphines, phosphites and phosphates. Examples of suitable phosphates include phenylbisdodecyl phosphate, phenylbisneopentyl phosphate, phenylethylene hydrogen phosphate, phenyl-bis-3,5,5'-trimethylhexyl phosphate, ethyldiphenyl phosphate, 2-ethylhexyl di(p-tolyl), phosphate, diphenyl hydrogen phosphate, bis(2-ethyl-hexyl)p-tolylphosphate, tritolyl phosphate, bis(2-ethylhexyl)-phenyl phosphate, tri(nonylphenyl)phosphate, phenyl-methyl hydrogen phosphate, di(dodecyl)p-tolyl phosphate, tricresyl phosphate, triphenyl phosphate, isopropylated triphenyl phosphate, halogenated triphenyl phosphate, dibutylphenyl phosphate, 2-chlorethyldiphenyl phosphate, p-tolyl bis(2,5,5'-trimethylhexyl)phosphate, 2-ethylhexyldiphenyl phosphate, and the like.

Preferred phosphates include triphenyl phosphate, alkylated triphenyl phosphates, including isopropylated and butylated triphenyl phosphates, bis-neopentyl piperidinyl diphosphate, tetraphenyl bisphenol-A diphosphate, tetraphenyl resorcinol diphosphate, tetraphenyl hydroquinone diphosphate, bisphenol-A poly(phenylphosphate), mixtures of these compounds and derivatives of these compounds. Also included are aluminum salts of phosphates, phosphinate, and phosphonates. Representative examples include aluminum tris(O-methylmethylphosphonate), aluminum tris (O-ethylmethylphosphonate) aluminum tris(O-ethylethylphosphonate). Other suitable flame retardants include magnesium hydroxide, zinc borate, and the like.

In a preferred embodiment, the flame retardant comprises a metallophosphorous flame retardant having the formula

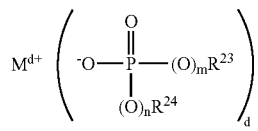

wherein M is Al or Zn, d is 3 for Al or 2 for Zn, each occurrence of $R^{23}$ and $R^{24}$ is independently $C_1$–$C_{18}$ hydrocarbyl; and each occurrence of m and n is 0 or 1. In one embodiment, each occurrence of $R^{23}$ and $R^{24}$ is independently $C_1$–$C_6$ alkyl. In another embodiment, each occurrence of $R^{23}$ and $R^{24}$ is methyl or ethyl. In one embodiment, each occurrence of m and n is zero. Suitable metallophosphorous flame retardants include, for example, zinc and aluminum salts of dimethylphosphinate, diethylphosphinate, di-n-propylphosphinate, di-n-butylphosphinate, di-n-hexylphosphinate, dicyclohexylphosphinate, di-2-ethylhexylphosphinate, diphenylphosphinate, di-o-tolylphosphinate, dimethylphosphate, diethylphosphate, di-n-propylphosphate, di-n-butylphosphate, di-n-hexylphosphate, dicyclohexylphosphate, di-2-ethylhexylphoshate, diphenylphosphate, di-o-tolylphosphate, and the like, and mixtures thereof. A preferred metallophosphorous flame retardant is aluminum tris(diethylphosphinate). Preparation of metallophosphorous flame retardants is described, for example, in U.S. Pat. Nos. 6,255,371 and 6,547,992 to Schlosser et al., and U.S. Pat. Nos. 6,355,832 and 6,534,673 to Weferling et al.

When the composition comprises the metallophosphorous flame retardant, it may be present at about 0.1 to about 50 parts by weight per 100 parts by weight total of the functionalized poly(arylene ether) and the acryloyl monomer. Within this range, the metallophosphorous flame retardant amount may preferably be at least about 1 part by weight, more preferably at least about 4 parts by weight, still more preferably at least about 8 parts by weight. Also within this range, the metallophosphorous flame retardant amount may preferably be up to about 40 parts by weight, more preferably up to about 30 parts by weight, still more preferably up to about 20 parts by weight.

Further suitable flame retardants include compounds containing a phosphorus-nitrogen bond include phosphonitrilic chloride, phosphorus ester amides, phosphoric acid amides, phosphonic acid amides, and phosphinic acid amides. Bisphosphoramide materials derived from piperazine and hydroxyaromatic compounds are especially useful.

Combinations of the above flame retardants may be employed.

Suitable phosphorous flame retardant additives are commercially available and methods for preparing the phosphate flame retardants are generally known in the art. As an example, the compounds may be prepared by reacting a halogenated phosphate compound with various dihydric or trihydric phenolic compounds until the desired number of phosphate functional groups are obtained. Examples of the phenolic compounds are dihydroxy aromatic compounds such as resorcinol and hydroquinone.

When present, the flame retardant may be used in an amount of about 0.5 to about 30 weight percent, based on the total weight of the composition. A preferred level for the phoshorous flame retardants is about 9 to about 17 weight percent. In some embodiments it is preferable to use the phoshorous flame retardants such as triphenyl phosphate in combination with other flame retardants such as hexabromobenzene and, optionally, antimony oxide.

The compositions may, optionally, further comprise other additives to modify the properties of the composition. For example, dye, pigments, colorants, and mineral fillers may be included in the composition such as titanium dioxide, calcium carbonate, talc, silica, mica, etc. Mineral fillers may be included in amounts of about 1 to about 40 weight percent, preferably about 5 to about 35 weight percent, based on the total weight of the composition. Other additives that may be included in the compositions include metal particles, reinforcing agents (e.g., glass fibers), conductive fillers (e.g., conductive carbon black, carbon fibers, stainless steel fibers, metal flakes and metal powders), antioxidants, heat stabilizers, light stabilizers, antiblocking agents, antistatic agents, plasticizers, processing aids, lubricants, drip retardants, flow modifiers, and the like. The above additives are known in the art, and suitable amounts may be determined without undue experimentation. In one embodiment, the composition may comprise about 1 to about 50 parts by weight of unfunctionalized poly(arylene ether) per 100 parts by weight for the total of the functionalized poly(arylene ether) and the olefin-alkyl(meth)acrylate copolymer.

The composition exhibits excellent property balances. For example, the composition after molding may have a flammability rating of V-1, more preferably V-0, measured according to UL-94. The composition after molding may have a tensile strength at maximum load of at least 1 megapascal, preferably at least 3 megapascals, still more preferably at least 7 megapascals, measured at 25° C. according to ASTM D638. The composition may have a tensile elongation at break of at least –100 percent, preferably at least 150 percent, still more preferably at least 200 percent, even more preferably at least 100 percent, yet more preferably at least 150 percent, and still more preferably at least 200 percent, measured at 25° C. according to ASTM D638.

In one embodiment, the composition comprises a capped poly(arylene ether); an olefin-alkyl(meth)acrylate copolymer; a copolymer of an alkenyl aromatic compound and a conjugated diene; and a halogen-free flame retardant.

In another embodiment, the composition comprises about 25 to about 95 parts by weight of a methacrylate-capped poly(arylene ether); about 5 to about 75 parts by weight of an ethylene-methyl acrylate copolymer; about 5 to about 20 parts by weight of a copolymer of an alkenyl aromatic compound and a conjugated diene; and about 0.5 to about 30 parts by weight of a halogen-free flame retardant; wherein all parts by weight are based on 100 parts by weight total of the methacrylate-capped poly(arylene ether) and the ethylene-methyl acrylate copolymer.

Another embodiment is a composition, comprising: a poly(arylene ether); an olefin-alkyl(meth)acrylate copolymer; and a metallophosphorous flame retardant having the formula

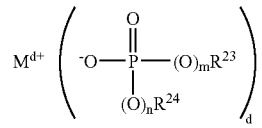

wherein M is Al or Zn, d is 3 for Al or 2 for Zn, each occurrence of $R^{23}$ and $R^{24}$ is independently $C_1$–$C_{18}$ hydrocarbyl; and each occurrence of m and n is 0 or 1. In this embodiment, the poly(arylene ether) may be a functionalized poly(arylene ether), as described above. Alternatively, the poly(arylene ether) may be an unfunctionalized poly (arylene ether), also described above. The unfunctionalized poly(arylene ether) resin may have an intrinsic viscosity of about 0.1 to about 0.6 dL/g.

Another embodiment is a method of preparing a composition, comprising: blending a functionalized poly(arylene ether) and an olefin-alkyl acrylate copolymer to form an intimate blend. Any known apparatus may be used to carry out the method. Utilization of the method on a laboratory scale may employ a lab-scale mixer such as, for example, a Labo Plastomill available from Toyo Seiki Company, Hyogo, Japan. Preferred apparatuses for conducting the method on a larger scale include single-screw and twin-screw extruders, with twin-screw extruders being more preferred. Extruders for melt blending of thermoplastics are commercially available from, for example, Coperion in Ramsey, N.J.

It will be understood that the invention includes compositions wherein the specified components have reacted to form reaction products. Thus, another embodiment is a composition comprising the reaction product of a functionalized poly(arylene ether); and an olefin-alkyl(meth)acrylate copolymer.

The invention includes articles comprising any of the above compositions and their reactions products. Thus, one embodiment is an article comprising a composition comprising a functionalized poly(arylene ether) and an olefin-alkyl(meth)acrylate copolymer. Another embodiment is a composition comprising the reaction product of a functionalized poly(arylene ether) and an olefin-alkyl (meth)acrylate copolymer. The composition is particularly useful for fabricating insulation for cable and wire, because, in addition to exhibiting the improved properties described herein, the composition avoids the environmental concerns associated with the polyvinyl chloride resins currently used in such applications. Articles may be fabricated by known techniques for forming thermoplastic articles, including injection molding, blow molding, wire extrusion, and the like.

Concrete examples of insulated wire and cable comprising the cured composition as insulation include an electric cable in which at least the conductor is covered with an insulating layer comprising the cured composition. It is possible to change the conductor parts into aggregated wires, install a semiconducting layer between the conductor and insulating layer, or alternatively, form a flame retardant resin layer on the outer side of the insulating layer, if desired. Examples of the electric wire and cable may include a cable comprising a wire which is formed from an aggregate of copper wires, a semiconducting layer which is covering the wire and formed by a resin composition to which a conductive carbon or metal powder has been added, an insulating layer which is covering the semiconducting layer and formed by the cured composition, a covering or semiconducting layer which is covering the insulating layer and formed by a metal sheet, and a flame-retardant cured composition that is provided on the outermost side; and a cable comprising an aggregate of covered-copper wires and a flame-retardant cured composition that is provided on the outermost side of the aggregate, wherein the covered-copper wire comprise a single copper wire, a semiconductor layer covering the wire, an insulating layer covering the semiconducting layer and formed by the cured composition, and a metal film layer further provided onto the insulating layer; and the like.

Another embodiment is a composition comprising a poly (arylene ether) and a polyolefin. The poly(arylene ether) and the polyolefin may be compatibilized by the presence of a graft copolymer comprising a polyolefin backbone and one or more poly(arylene ether) grafts. This copolymer may be formed by irradiating porous polyolefin, thereby forming radical sites on the polyolefin, and then melt blending the irradiated porous polyolefin with a reactive-capped poly (arylene ether). The copolymer may also be formed by initiating polymerization of a phenol, such as 2,6-dimethylphenol, on the radical sites of the poly olefin. In addition to the poly(arylene ether), the polyolefin, and the compatibilizing copolymer, the composition may further comprise polystyrene, rubber modified polystyrene, glass beads, glass fibers, poly(methyl methacrylate), modified polypropylene, styrene-butadiene block copolymer (SB), styrene-isoprene block copolymer (SI), hydrogenated styrene-butadiene block copolymer (SEB), hydrogenated styrene-isoprene block copolymer (SEP), styrene-butadiene-styrene triblock copolymer (SBS) and its hydrogenated counterpart (SEBS), styrene-isoprene-styrene triblock copolymer (SIS) and its hydrogenated counterpart (SEPS), styrene-methyl methacrylate block copolymer, and the like. In one example of a method for forming the composition, methacrylate-capped poly(arylene ether), polypropylene, and free radical initiator are fed into an extruder at the same or different position along the stream. In another example of a method for forming the compatibilizing process option, methacrylate-capped poly(arylene ether), and porous polypropylene could be irradiated prior to melting reaction in extruder to generate "trapped free radical sites" on polymer chains. The methacrylate-capped poly(arylene ether) is fed at the feed throat to melt. The irradiated polypropylene is introduced downstream to achieve the grafting to the methacrylate-capped poly(arylene ether). The methacrylate-capped poly(arylene ether) may experience delayed melting. For methacrylate-capped poly(arylene ether) having low intrinsic viscosity (e.g., 0.12 dL/g), both methacrylate-capped poly(arylene ether) and polypropylene may be fed to the extruder at the same time. For this process, free radical initiator may, optionally, be fed into extruder to adjust reaction process and control final product quality.

The invention is further illustrated by the following non-limiting examples.

PREPARATIVE EXAMPLE A

To a solution of 3 liters of toluene in a 5-liter 3-necked round bottom flask was added 1500 grams of poly(2,6-dimethylphenyl ether) resin (intrinsic viscosity=0.30 dL/g), 153 grams (1.0 mole) of methacrylic anhydride, and 121 grams (1.0 mole) of dimethylaminopyridine. The solution was heated at reflux overnight. The desired product was precipitated into methanol and isolated by filtration. The resulting product (MAA-PPE) was dried at 80° C. overnight in vacuo. The yield of product was 1333 g. Exposure of the product to a phosphorus functionalizing agent and subsequent analysis by $^{31}$P-NMR (CDCl$_3$; 2,3-dioxaphospholane) indicated no detectable aromatic hydroxy groups (i.e., less than 5 micromoles of hydroxyl groups per gram of the poly(arylene ether)). $^1$H-NMR (CDCl$_3$, TMS): 2.07 (s, 6H; PPE CH$_3$); 2.18 (s, 3H, methacrylate CH$_3$); 5.74 (s, 2H, methacrylate CH$_2$); 6.46 (s, 2H PPE Ar—H); 7.08 (m, 3H, PPE tail endgroup).

EXAMPLES 1–7, COMPARATIVE EXAMPLES 1–7

For Example 1, a blend was prepared comprising 500 grams of methacrylate-capped poly(phenylene ether) (500 g) as prepared in Preparative Example A and 500 g of poly(ethylene-co-methyl acrylate) (6.5% methyl acrylate) obtained from Atofina and having a with methyl acrylate content of 6.5%. The blend was melt compounded on a Prism twin-screw extruder having the following settings (barrel temps of 140/170/240/270/270° C.; Zones1/2/3/4/ Nozzle) and injection molded into test specimens in a Boy Injection Molder (mold temperature=40° C.; barrel temperatures=160/210/200 in Zones 1/2/nozzle). The resulting test specimens were used to measure tensile strength at maximum load (expressed in megapascals, MPa) and tensile elongation at break (expressed in percent) according to ASTM D638. The results are shown in Table 1. Other inventive and comparative examples were similarly prepared. The unfunctionalized poly(arylene ether) was the poly(2,6-dimethylphenyl ether) resin having an intrinsic viscosity of 0.30 dL/g that was used in Preparative Example A. All poly(ethylene-co-methyl acrylate) resins were obtained from Atofina and had the methyl acrylate contents specified in Table 1. The impact modifier used in Example 7, KRATON® G1701, is a hydrogenated styrene-isoprene copolymer having a styrene content of about 37 weight percent. Compositions and properties are summarized in Table 1. The results show that Examples 1 and 2, with functionalized poly(arylene ether) exhibit improved compatibility compared to Comparative Examples 1 and 2 with unfunctionalized poly(arylene ether), which delaminated. The results also show that the composition of Example 2, containing a poly(ethylene-co-methyl acrylate) with 6.5% methyl acrylate, exhibits improved tensile strength and elongation compared to the pure PPE composition of Comparative Example 7. Furthermore, the results show that Example 7, which includes an impact modifier, exhibits outstanding tensile elongation while maintaining high impact strength.

EXAMPLES 8–10

The procedure of Example 1 was used to prepare compositions further comprising a flame retardant. The poly (ethylene-co-methyl acrylate) had a methyl acrylate content of 27 weight percent and was obtained from Atofina. The poly(arylene ether) was unfunctionalized poly(2,6-dimethylphenyl ether) resin having an intrinsic viscosity of 0.40 dL/g prepared as in Preparative Example A. The impact modifier was a hydrogenated styrene-isoprene-styrene triblock copolymer obtained as KRATON® G1701 from Kraton Polymers. The halogen-free flame retardant was aluminum tris(diethylphosphinate) obtained as OP930 from Clariant. All component amounts are expressed in weight percent (wt %). Tensile strength at offset (expressed in megapascals, MPa), tensile strength at maximum load (expressed in MPa), tensile modulus (expressed in MPa), and tensile elongation at break (expressed in percent) were measured according to ASTM D638. Shore A hardness was measured according to ISO 868. Flammability was measured according to the UL-94 test, in which multiple samples are exposed to flame ten seconds and, if burning then ceases within 30 seconds, reexposed to flame for another ten seconds. The desirable UL-94 V-0 rating requires, inter alia, that specimens may not burn with flaming combustion for more than 10 seconds after either application of the test flame, and that specimens may not drip flaming particles that ignite the dry absorbent surgical cotton located 300 mm below the test specimen. Standard deviations reflect measurements on three samples per test. Compositions and properties are summarized in Table 2. The results show that the composition of Example 10, containing 17.5 weight percent flame retardant, achieves a desirable V-0 rating in the UL-94 flammability test.

TABLE 1

| | Composition | | | | | Properties | | |
|---|---|---|---|---|---|---|---|---|
| | PPE type | PPE amount (wt %) | methyl acrylate content of poly(ethylene-co-methyl acrylate) (wt %) | poly(ethylene-co-methyl acrylate) (wt%) | KRATON® G1701 (wt %) | Appearance | Tensile strength at max. load (MPa) | Tensile elongation at break (%) |
| Ex. 1 | functionalized | 50 | 6.5 | 50 | 0 | good | 10.56 | 10.6 |
| Ex. 2 | functionalized | 50 | 16.5 | 50 | 0 | good | 13.02 | 27 |
| Ex. 3 | functionalized | 50 | 27 | 50 | 0 | good | 6.43 | 45 |
| Ex. 4 | functionalized | 50 | 29 | 50 | 0 | good | 6.47 | 67 |
| Ex. 5 | functionalized | 30 | 29 | 70 | 0 | good | 0.526 | 251 |
| Ex. 6 | functionalized | 40 | 29 | 60 | 0 | good | 0.827 | 84 |
| Ex. 7 | functionalized | 29 | 29 | 65 | 6 | good | 3.54 | 554 |
| C. Ex. 1 | unfunctionalized | 50 | 6.5 | 50 | 0 | delaminated | 22.06 | 33 |
| C. Ex. 2 | unfunctionalized | 50 | 16.5 | 50 | 0 | delaminated | 22.09 | 22 |
| C. Ex. 3 | unfunctionalized | 50 | 27 | 50 | 0 | good | 6.34 | 41 |
| C. Ex. 4 | unfunctionalized | 50 | 29 | 50 | 0 | good | 6.87 | 55 |
| C. Ex. 5 | unfunctionalized | 30 | 29 | 70 | 0 | good | 0.672 | 237 |
| C. Ex. 6 | unfunctionalized | 40 | 29 | 60 | 0 | good | 0.712 | 109 |
| C. Ex. 7 | unfunctionalized | 100 | — | 0 | 0 | good | 7.998 | 30 |

TABLE 2

|  | Ex. 8 | Ex. 9 | Ex. 10 |
|---|---|---|---|
| Composition |  |  |  |
| poly(ethylene-co-methyl acrylate) amount (wt %) | 60.00 | 54.00 | 49.50 |
| poly(arylene ether) amount (wt %) | 35.00 | 31.50 | 28.88 |
| KRATON ® G1701 amount (wt %) | 5.00 | 4.50 | 4.13 |
| OP930 amount (wt %) | 0.00 | 10.00 | 17.50 |
| Properties |  |  |  |
| Tensile strength at offset (MPa) | 2.017 ± 0.135 | 2.577 ± 0.246 | 3.238 ± 0.140 |
| Tensile strength at max. load (MPa) | 3.47 ± 0.20 | 3.58 ± 0.37 | 3.46 ± 0.07 |
| Tensile modulus (MPa) | 16.39 ± 3.43 | 25.48 ± 0.98 | 34.08 ± 1.63 |
| Tensile elongation (%) | 708 ± 75 | 363 ± 44 | 273 ± 22 |
| Shore A Hardness | 71 ± 1 | 72 ± 2 | 77 ± 1 |
| UL-94 flammability | flaming drip | fail | V-0 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

The invention claimed is:

1. A composition, comprising:
   a functionalized poly(arylene ether); and
   an olefin-alkyl (meth)acrylate copolymer; wherein the olefin-alkyl (meth)acrylate copolymer is the polymerization product of (a) an olefin selected from ethylene and $C_3$–$C_8$ α-olefins, and (b) an alkyl (meth)acrylate, wherein the alkyl group is selected from methyl, propyl, n-butyl, n-pentyl, n-hexyl, n-heptyl, n-octyl.

2. The composition of claim 1, wherein the functionalized poly(arylene ether) is a capped poly(arylene ether) having the structure Q(J-K)$_y$, wherein Q is the residuum of a monohydric, dihydric, or polyhydric phenol; y is 1 to 100; J comprises repeating structural units having the formula

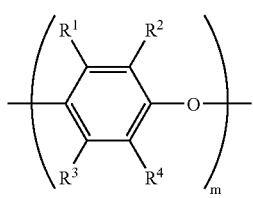

wherein $R^1$ and $R^3$ are each independently selected from the group consisting of hydrogen, halogen, primary or secondary $C_1$–$C_{12}$ alkyl, $C_2$–$C_{12}$ alkenyl, $C2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbonoxy, and $C_2$–$C_{12}$ halohydrocarbonoxy wherein at least two carbon atoms separate the halogen and oxygen atoms; $R^2$ and $R^4$ are each independently selected from the group consisting of halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbonoxy, and $C_2$–$C_{12}$ halohydrocarbonoxy wherein at least two carbon atoms separate the halogen and oxygen atoms; m is 1 to about 200; and K is a capping group selected from the group consisting of

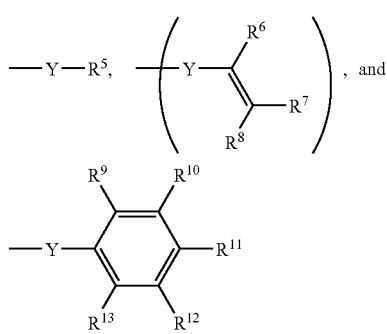

wherein $R^5$ is $C_1$–$C_{12}$ alkyl; $R^6$–$R^8$ are each independently selected from the group consisting of hydrogen, $C_1$–$C_{18}$ hydrocarbyl, $C_2$–$C_{18}$ hydrocarbyloxycarbonyl, nitrile, formyl, carboxylate, imidate, and thiocarboxylate; $R^9$–$R^{13}$ are each independently selected from the group consisting of hydrogen, halogen, $C_1$–$C_{12}$ alkyl, hydroxy, and amino; and wherein Y is a divalent group selected from the group consisting of

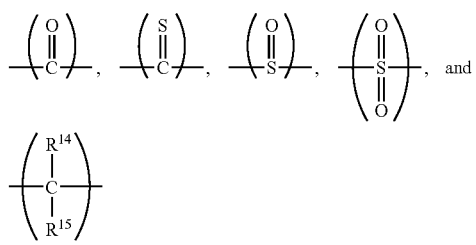

wherein $R^{14}$ and $R^{15}$ are each independently selected from the group consisting of hydrogen and $C_1$–$C_{12}$ alkyl.

3. The composition of claim 2, wherein Q is the residuum of a monohydric phenol.

4. The composition of claim 2, wherein the capped poly(arylene ether) comprises at least one capping group having the structure

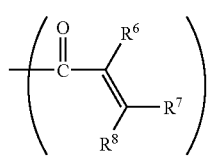

$R^6$–$R^8$ each independently selected from the group consisting of hydrogen, $C_1$–$C_{18}$ hydrocarbyl, $C_2$–$C_{18}$ hydrocarbyloxycarbonyl, nitrile, formyl, carboxylate, imidate, and thiocarboxylate.

5. The composition of claim 1, wherein the functionalized poly(arylene ether) is a ring-functionalized poly(arylene ether) comprising repeating structural units having the formula

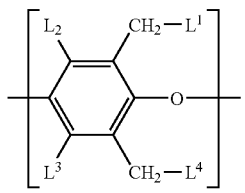

wherein each $L^1$–$L^4$ is independently hydrogen, an alkenyl group, or an alkynyl group; wherein the alkenyl group is represented by

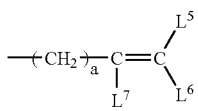

wherein $L^5$–$L^7$ are independently hydrogen or methyl, and a is an integer from 0 to 4; wherein the alkynyl group is represented by

wherein $L^8$ is hydrogen, methyl, or ethyl, and b is an integer from 0 to 4; and wherein about 0.02 mole percent to about 25 mole percent of the total $L^1$–$L^4$ substituents in the ring-functionalized poly(arylene ether) are alkenyl and/or alkynyl groups.

6. The composition of claim 1, wherein the functionalized poly(arylene ether) is a maleic anhydride-functionalized poly(arylene ether) comprising an end-group having the formula

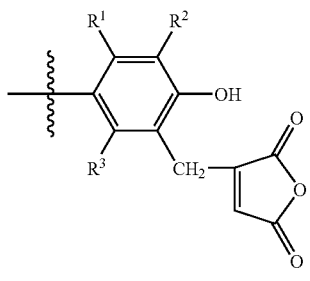

wherein $R^1$ and $R^3$ are each independently selected from the group consisting of hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbonoxy, and $C_2$–$C_{12}$ halohydrocarbonoxy wherein at least two carbon atoms separate the halogen and oxygen atoms; and R2 is selected from the group consisting of hydrogen, halogen, primary or secondary $C_1$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbonoxy, and $C_2$–$C_{12}$ halohydrocarbonoxy wherein at least two carbon atoms separate the halogen and oxygen atoms.

7. The composition of claim 1, wherein the functionalized poly(arylene ether) has an intrinsic viscosity less than or equal to 0.30 deciliters per gram measured in chloroform at 25° C.

8. The composition of claim 1, comprising about 25 to about 95 parts by weight of the functionalized poly(arylene ether) per 100 parts by weight total of the functionalized poly(arylene ether) and the olefin-alkyl (meth)acrylate copolymer.

9. The composition of claim 1, wherein the olefin-alkyl (meth)acrylate copolymer is the polymerization product of about 60 to about 95 weight percent of the olefin and about 5 to about 40 weight percent of the alkyl (meth)acrylate.

10. The composition of claim 9, wherein the olefin is selected from the group consisting of ethylene, propylene, 1-butene, 1-pentene, 1hexene, 1-heptene, 1-octene, and 4-methyl-1-pentene.

11. The composition of claim 1, wherein the olefin-alkyl (meth)acrylate copolymer is selected from the group consisting of ethylene-methyl acrylate copolymer, and ethylene-methyl methacrylate copolymer.

12. The composition of claim 1, wherein the olefin-alkyl (meth)acrylate copolymer is ethylene-methyl acrylate copolymer.

13. The composition of claim 1, wherein the olefin-alkyl (meth)acrylate copolymer has a calculated solubility parameter of at least 8.75 $J^{1/2}/cm^{3/2}$.

14. The composition of claim 1, comprising about 5 to about 75 parts by weight of the olefin-alkyl (meth)acrylate copolymer per 100 parts by weight total of the functionalized poly(arylene ether) and the olefin-alkyl (meth)acrylate copolymer.

15. The composition of claim 1, further comprising an impact modifier.

16. The composition of claim 15, wherein the impact modifier is a block copolymer of an alkenyl aromatic compound and a conjugated diene.

17. The composition of claim 15, comprising about 0.1 to about 30 parts by weight of the impact modifier per 100 parts by weight for the total of the functionalized poly(arylene ether) and the olefin-alkyl (meth)acrylate copolymer.

18. The composition of claim 1, further comprising a flame retardant.

19. The composition of claim 18, wherein the flame retardant is a metallophosphorous flame retardant having the formula

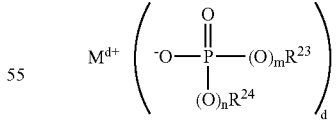

wherein M is Al or Zn, d is 3 for Al or 2 for Zn, each occurrence of $R^{23}$ and $R^{24}$ is independently $C_1$–$C_{18}$ hydrocarbyl; and each occurrence of m and n is 0 or 1.

20. The composition of claim 1, further comprising an additive selected from the group consisting of dyes, pigments, colorants, mineral fillers, reinforcing agents, antioxidants, heat stabilizers, light stabilizers, plasticizers, lubricants, flow modifiers, drip retardants, antiblocking agents, antistatic agents, processing aids, and combinations thereof.

21. The composition of claim 1, wherein the composition after molding has UL-94 flammability rating of V-1 or V-0.

22. The composition of claim 1, wherein the composition after molding has a tensile strength at maximum load or at least 1 megapascal, measured at 25° C. according to ASTM D638.

23. The composition of claim 1, wherein the composition after molding has a tensile elongation at break or at least 40 percent, measured at 25° C. according to ASTM D638.

24. The composition of claim 1, wherein the composition after molding has a tensile strength at maximum load of at least 3 megapascal, measured at 25° C. according to ASTM D638, and a tensile elongation at break of at least 40 percent, measured at 25° C. according to ASTM D638.

25. A composition, comprising the reaction product of
 a functionalized poly(arylene ether); and
 an olefin-alkyl (meth)acrylate copolymer; wherein the olefin-alkyl (meth)acrylate copolymer is the polymerization product of (a) an olefin selected from ethylene and $C_3$–$C_8$ α-olefins, and (b) an alkyl (meth)acrylate, wherein the alkyl group is selected from methyl, propyl, n-butyl, n-pentyl, n-hexyl, n-heptyl, n-octyl.

26. A method of preparing a composition, comprising: blending a functionalized poly(arylene ether) and an olefin-alkyl acrylate copolymer to form an intimate blend; wherein the olefin-alkyl (meth)acrylate copolymer is the polymerization product of (a) an olefin selected from ethylene and $C_3$–$C_8$ α-olefins, and (b) an alkyl (meth)acrylate, wherein the alkyl group is selected from methyl, propyl, n-butyl, n-pentyl, n-hexyl, n-heptyl, n-octyl.

27. An article comprising the composition of claim 1.

28. An article comprising the composition of claim 25.

* * * * *

UNITED STATES PATENT AND TRADEMARK OFFICE
CERTIFICATE OF CORRECTION

PATENT NO. : 7,211,639 B2
APPLICATION NO. : 10/678249
DATED : May 1, 2007
INVENTOR(S) : Gary William Yeager et al.

It is certified that error appears in the above-identified patent and that said Letters Patent is hereby corrected as shown below:

Title Page,
Item (56), References Cited, U.S. Patent Documents, after "4,097,550 A", delete "6/1978" and insert therefor -- 7/1978 --.

Title Page,
Item (56), References Cited, U.S. Patent Documents, after "4,059,654 A, 11/1977", delete "Von Bodugen et al" and insert therefor -- Van Bodugen et al --.

Title Page,
Item (56), References Cited, U.S. Patent Documents, after "6,057,013 A" delete "5/2000" and insert therefor -- 5/2002 --.

Column 3,
Line 41, after "aryl-substituted", delete "alkyl" and insert therefor --alkyl, --.

Column 6,
Lines 49-50, after "by" delete the formula and insert therefor

Column 19,
Line 67, after "alkenyl,", delete "C2" and insert therefor -- $C_2$ --.

Column 21
Lines 32-33, after "by", delete the formula and insert therefor

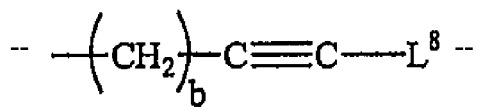

Column 21,
Lines 65-66, after "secondary", delete "$C_1$-$C_{12}$ alkenyl, $C_2$-$C_{12}$ alkynyl," and insert therefor -- $C_1$-$C_2$ alkyl, $C_2$-$C_{12}$ alkenyl, $C_2$-$C_{12}$ alkynyl, --.

Column 22,
Line 19, after "1-pentene," delete "1-hexene," and insert therefor --1-hexene, --.

UNITED STATES PATENT AND TRADEMARK OFFICE
CERTIFICATE OF CORRECTION

PATENT NO. : 7,211,639 B2
APPLICATION NO. : 10/678249
DATED : May 1, 2007
INVENTOR(S) : Gary William Yeager et al.

It is certified that error appears in the above-identified patent and that said Letters Patent is hereby corrected as shown below:

Column 23,
Line 4, after "load", delete "or" and insert therefor -- of --.
Line 8, after "break", delete "or" and insert therefor -- of --.

Signed and Sealed this

Twenty-seventh Day of November, 2007

JON W. DUDAS
*Director of the United States Patent and Trademark Office*